US007017306B2

(12) United States Patent
Ryder

(10) Patent No.: US 7,017,306 B2
(45) Date of Patent: Mar. 28, 2006

(54) CONTAINMENT ASSEMBLY

(75) Inventor: Martyn Ryder, Brighouse (GB)

(73) Assignee: Carlisle Process Systems Limited, Dorset (GB)

( * ) Notice: Subject to any disclaimer, the term of this patent is extended or adjusted under 35 U.S.C. 154(b) by 0 days.

(21) Appl. No.: 10/029,537

(22) Filed: Dec. 21, 2001

(65) Prior Publication Data

US 2002/0129563 A1     Sep. 19, 2002

(30) Foreign Application Priority Data

Jan. 18, 2001  (GB) .................................. 0101299

(51) Int. Cl.
A47F 3/02      (2006.01)
A61L 9/00      (2006.01)

(52) U.S. Cl. .................. 52/36.1; 52/36.2; 52/39; 52/63; 312/1

(58) Field of Classification Search ................ 52/36.1, 52/36.2, 39, 63, 508, 741.3, 741.4, DIG. 17; 454/187, 57, 58, 52; 312/1, 3, 4; 160/102, 160/332; 134/177, 6; 588/249; 220/350
See application file for complete search history.

(56) References Cited

U.S. PATENT DOCUMENTS

| 2,786,740 | A | * | 3/1957 | Taylor et al. ................. 312/1 |
| 3,051,164 | A | * | 8/1962 | Trexler .......................... 312/1 |
| 3,272,199 | A | * | 9/1966 | Matthews ................... 600/21 |
| 3,348,890 | A | * | 10/1967 | Trexler .......................... 312/1 |
| 3,518,991 | A | * | 7/1970 | Goss ............................ 454/57 |
| 3,576,206 | A | * | 4/1971 | Trexler ........................ 454/57 |
| 3,709,210 | A | * | 1/1973 | Matthews ................... 600/21 |
| 3,744,055 | A | * | 7/1973 | Brendgord ....................... 2/2 |
| 3,802,416 | A | * | 4/1974 | Cazalis ......................... 600/21 |
| 4,304,224 | A | * | 12/1981 | Fortney ..................... 128/1 R |
| 4,335,712 | A | * | 6/1982 | Trexler ..................... 128/1 R |
| 4,485,489 | A | * | 12/1984 | Pilie et al. .................... 2/457 |
| 4,676,144 | A | * | 6/1987 | Smith, IIi .................... 98/1.5 |
| 4,817,644 | A | * | 4/1989 | Holmes et al. ............... 134/6 |
| 4,850,380 | A | * | 7/1989 | Koslow .................... 134/56 R |
| 4,911,191 | A | * | 3/1990 | Bain ......................... 134/200 |
| 4,920,768 | A | * | 5/1990 | Cares et al. .............. 68/18 R |
| 5,133,246 | A | * | 7/1992 | Campbell .................... 454/52 |

(Continued)

FOREIGN PATENT DOCUMENTS

| EP | 0 195 703 |   | 9/1986 |
| GB | 2215260 | * | 9/1989 |
| GB | 2 261 500 |   | 5/1993 |
| GB | 2 262 968 |   | 7/1993 |
| JP | 194042 | * | 8/1991 |
| JP | 157301 | * | 6/1993 |

(Continued)

*Primary Examiner*—Phi Dieu Tran A
(74) *Attorney, Agent, or Firm*—Berenato, White & Stavish LLC

(57) ABSTRACT

A containment assembly such as a down flow containment assembly including a barrier means between the processing zone and the operator breathing zone at least a first part of which is provided with flexible gloves for access to and maneuverability in the processing zone.

16 Claims, 5 Drawing Sheets

U.S. PATENT DOCUMENTS

| | | | |
|---|---|---|---|
| 5,195,922 A | * 3/1993 | Genco | 454/57 |
| 5,276,252 A | * 1/1994 | Biros et al. | 588/249 |
| 5,542,463 A | * 8/1996 | Pinkalla et al. | 160/273.1 |
| 5,563,066 A | * 10/1996 | Buchanan | 435/264 |
| 5,824,161 A | 10/1998 | Atkinson | |
| 5,997,399 A | 12/1999 | Szatmary | |
| 6,264,055 B1 | * 7/2001 | Dozier | 220/483 |
| 6,461,290 B1 | * 10/2002 | Reichman et al. | 600/21 |

FOREIGN PATENT DOCUMENTS

| | | | |
|---|---|---|---|
| JP | 332588 | * | 12/1993 |
| JP | 101881 | * | 4/1994 |
| JP | 272921 | * | 9/1994 |

* cited by examiner

PRIOR ART

CONTAINMENT ASSEMBLY

BACKGROUND OF THE INVENTION

1. Field of the Invention

The present invention relates to a containment assembly (e.g., a down flow containment assembly) comprising a barrier means at least a first part of which is composed of flexible material, and to the barrier means itself.

2. Description of the Related Art

A conventional containment assembly comprises a powder handling booth of sufficient size to admit an operator for the purposes of handling (for example) pharmaceuticals or chemicals in a processing zone. The air quality in and around the processing zone may be controlled using forced ventilation. One category of forced ventilation is "down flow" in which surrounding air is pushed downwardly to entrain airborne particles to a level below the processing zone (e.g., to a level below the typical operator's breathing zone). For down flow containment, exhaust is usually carried out at low level relative to the source of particles. Current Good Manufacturing Practices exercised within the pharmaceutical manufacturing industry demand good containment performance and acceptable operator exposure levels.

A traditional down flow containment assembly is illustrated schematically in FIG. 1a (with air flow denoted A) for the purposes of (for example) handling a pharmaceutical powder within a powder drum 3. An operator 2 is subjected to exposure levels in the operator breathing zone 1 typically in the range 150 to 1000 $\mu g/m^3$ (and possibly higher). In order to improve containment and to reduce exposure of operator 2 to airborne powder in the operator breathing zone 1, it has been known since about 1990 to isolate the operator's position by fitting a work station 4 into the down flow containment assembly (see FIG. 1b). The work station 4 typically reduces operator exposure levels to about 50 $\mu g/m^3$. In a more recent development (see FIG. 1c), a transparent rigid screen 6 of a "salad bar" type has been found to improve exposure levels in the operator breathing zone 1 to about 10 $\mu g/m^3$. The salad bar screen 6 allows the operator 2 to manipulate the powder through a gap between the work station 4 and the salad bar screen 6.

Notwithstanding these significant improvements, the pharmaceutical industry is striving for the effectiveness of a down flow containment assembly to be improved so that the exposure level in the operator breathing zone is less than 10 $\mu g/m^3$. Moreover, with a conventional down flow assembly, there remains a significant risk of high localized contamination of (for example) the operator's hands or clothing which is quite unacceptable for handling pharmaceuticals or chemicals. Added to this, the work station and work station/salad bar developments restrict access to (and maneuverability in) the processing zone and are particularly prohibitive to unusually short or tall operators.

Objects of the Invention

The present invention seeks to improve operator exposure levels in a containment assembly (e.g., a down flow containment assembly) by providing a barrier means between the processing zone and the operator breathing zone. This is achieved without hindering the access to (or the maneuverability in) the processing zone of an operator of any height.

SUMMARY OF THE INVENTION

Thus viewed from one aspect the present invention provides a containment assembly comprising a powder handling booth of sufficient size to admit an operator, the powder handling booth having a rear wall, a floor and an upper surface. The containment assembly further comprises a barrier means at least a first part of which (preferably substantially the whole of which) is composed of flexible material. The barrier means is positioned in the powder handling booth and spaced apart from the rear wall to define a processing zone between the barrier means and the rear wall. The first part of the barrier means is adapted (or is adaptable) to permit the operator in the powder handling booth outside the processing zone to operate inside the processing zone.

It has been surprisingly found that the barrier means of the invention reduces operator exposure levels significantly beyond the 10 $\mu g/m^3$ threshold desired by the pharmaceutical industry (typically to a level in the range 1 to 5 $\mu g/m^3$) whilst ensuring no localized contact with the materials being handled. The barrier means may be installed within minutes by an unskilled operator.

In a preferred embodiment, more than the first part of the barrier means is composed of flexible material. Particularly preferably, substantially the whole of the barrier means is composed of flexible material which maximizes the degree of freedom available to the operator for operating within the processing zone.

The barrier means may be a screen barrier (e.g., a curtain-type screen barrier), at least the first part (preferably more than the first part) of which is composed of flexible material. Preferably substantially the whole of the screen barrier is composed of flexible material.

The barrier means may be an enclosure barrier (e.g., a curtain-type enclosure barrier) at least the first part (preferably more than the first part) of which is composed of flexible material. Preferably, the enclosure barrier consists essentially of a front sheet, a first side sheet and optionally a second side sheet which when positioned in the powder handling booth spaced apart from the rear wall defines an enclosed processing zone. Preferably substantially the whole of the front sheet is composed of flexible material (and particularly preferably substantially the whole of the first side (and optionally the second side sheet) is additionally composed of flexible material). Preferably the front sheet (and optionally the side sheet) is adapted (or is adaptable) to permit the operator in the powder handling booth outside the processing zone to operate inside the processing zone.

The barrier means typically extends at least between the upper surface and the floor of the powder handling booth. The barrier means may be fitted at its lower edge to the floor of the powder handling booth. Preferably the barrier means at or near to its lower edge is untethered and extends into an excess of flexible material. This advantageously makes the first part of the barrier means vertically moveable (without compromising the improvement in exposure levels) to suit unusually short or tall operators.

The barrier means may be fitted at or near to its upper edge permanently or non-permanently to the upper surface (e.g., the ceiling) of the powder handling booth in any convenient manner (e.g., using suitable fixings or adhesive). Specific examples of fixings include hooks or Velcro. The barrier means may be fitted at or near to one (or both) of its vertical side edges to the rear wall in a similar manner. Alternatively, the barrier means may be bound within a rigid framework to define a self-contained unit.

In a preferred embodiment, the first part of the barrier means comprises one (or more than one) flexible portion in the shape of a glove (or one (or more than one) flexible portion capable of being deformed into the shape of a glove).

Particularly preferably the first part of the barrier means comprises more than one flexible portion in the shape of a glove (or capable of being deformed into the shape of a glove). Typically the first part of the barrier means comprises four flexible portions in the shape of a glove (or capable of being deformed into the shape of a glove).

In a preferred embodiment, the (or each) flexible portion in the shape of a glove (or capable of being deformed into the shape of a glove) comprises a flexible sleeve terminating in a gloved end. Preferably in use the flexible sleeve extends from the remaining part of the barrier means to beyond the operators elbow (to optimise maneuverability). The gloved end is typically composed of less flexible material than the flexible sleeve. For example, the gloved end may be composed of thicker polyurethane than that of the flexible sleeve (or alternatively of thicker PVC or other material).

The gloved end may be attached to the flexible sleeve in any conventional manner. Preferably the joint between the gloved end and the flexible sleeve comprises an internal strengthening ring to which the ends of the gloved end and the flexible sleeve are secured. For example, the ends of the gloved end and the flexible sleeve may be secured to the internal strengthening ring by an elastic band or the like.

At the joint of the (or each) flexible portion in the shape of a glove (e.g., the flexible sleeve) and the remaining part of the barrier means, there may be a strengthening portion (e.g., a strengthening ring or a thickened portion of material).

Typically the position and orientation of the (or each) flexible portion in the shape of a glove may be tailored to suit the particular operation conducted in the processing zone (e.g., in accordance with a particular machine which it is desired to operate).

The flexible material may be polyurethane or polyvinylchloride (PVC). In a preferred embodiment, the flexible material is polyurethane. Preferably the polyurethane is sufficiently thin to be effectively transparent. Generally speaking, the (or each) flexible portion in the shape of a glove is of thicker polyurethane (or PVC) to guard against tearing.

The barrier means may be fully or partially transparent. For example, the at least partially transparent flexible barrier means may comprise a transparent window at or near to a typical operator's eye height (or other heights as desired).

Preferably the powder handling booth is of box-like configuration having a rear wall, a floor and an upper surface (e.g., a ceiling).

In a preferred embodiment, the containment assembly is a down flow containment assembly further comprising means for inducing air flow downwardly in the powder handling booth, wherein the rear wall is adapted at or near its lower end to transmit externally an air flow and adapted at or near to its upper end to transmit internally the air flow. For example, the rear wall may be adapted at or near to its upper end with a ceiling through which air is transmitted.

The containment assembly may be of the down flow type disclosed in UK Patent application number 0009295.7 (Extract Technology Limited). For example, the powder handling booth may be a powder handling booth of box-like configuration having a rear wall positioned adjacent to a modular structure, wherein the modular structure is adapted at or near to its lower end to receive the airflow from the powder handling booth and at or near to its upper end to transmit the airflow to the powder handling booth, and the rear wall of the powder handling booth is adapted at or near to its lower end to transmit the airflow to the modular structure; and means for inducing the airflow downwardly in the powder handling booth.

The modular structure may be tailored to meet the requirements and conform to the size of a desired internal component. Examples of internal components may include part of the means for inducing the airflow such as, inter alia, one or more filters or a fan unit. For example, one or more filters may be housed in a lower part and a fan unit in an upper part of the modular structure. If desired, the modular structure may be panelled. Suitable panels include standard pressed or vacuum formed filter retainer panels. Panels may be attached using a proprietary adhesive tape and adhesive liquid seal to eliminate any tendency for product entrapment whilst giving overall structural rigidity. The adhesive tape provides a seal for the panel and the liquid adhesive seal ensures a substantially leak-free joint. The modular structure may be fabricated from aluminium extrusions joined in a conventional manner (e.g., permanently joined with an air tight corner piece) and may (for example) be adapted to vertically mount a filter such as a pre-filter (e.g., by incorporating a filter retainer panel) or to horizontally mount a filter such as a hepafilter at its lower end or to mount a fan unit at or near to its upper end.

In an embodiment of the containment assembly of the invention, the modular structure comprises an at least partially open front face at or near to its lower end and adjacent to the rear wall of the powder handling booth, wherein the rear wall of the powder handling booth at or near to its lower end comprises an elongated gap capable of transmitting air flow from the powder handling booth to and through the at least partially open front face of the modular structure. The at least partially open front face may be adapted to mount a prefilter (e.g., by incorporating a filter retainer panel).

In an embodiment of the containment assembly of the invention, the means for inducing the airflow comprises a fan unit driven by a flange mounted inverter controlled motor which ensures smooth drive via a flexible coupling. The fan motor unit is placed down flow from the filters ensuring that the unit is only exposed to clean filtered air. The fan unit may be seated on highly compressed anti-vibration mounts to ensure that no vibration is passed onto the adjacent parts of the booth.

Typically, the containment assembly of the invention is adapted so that air falls in an undisturbed, non-turbulent manner past the operator breathing zone at a predetermined velocity. Preferably the components of the assembly are adapted to attain perfect laminar flow (PLF) of air.

An embodiment of the containment assembly of the invention further comprises a plenum arrangement adjacent to an open ceiling of the powder handling booth (e.g., a framework), wherein the plenum arrangement is capable of transmitting the airflow from at or near to the upper end of the rear wall (or the modular structure) downwardly into the powder handling booth. The plenum arrangement may comprise one or more plenum chambers. The one or more or each chamber may be generally adapted to minimize the plenum volume. Preferably the one or more or each plenum chamber is adapted to contribute to perfect laminar flow (PLF).

The one or more or each plenum chamber may consist of only one external seal and is advantageously constructed without external sealants thereby eliminating a source of possible contamination whilst maintaining the desired level of cleanliness. The one or more or each plenum chamber may be detachable mounted to the ceiling of the powder handling booth (e.g., is a plug-in/plug-out arrangement)

making it sufficiently versatile to be attached to any type of powder handling booth. The one or more or each plenum chamber may comprise a metal (e.g., steel) base frame coated on two sides with a material of a preset tension. The base frame provides a specific pressure drop which may contribute to the perfect laminar flow (PLF). The base frame conveniently has a ladder-like configuration. For example, the base frame comprises two elongated side members joined in parallel spaced apart relationship by a plurality of transverse members. On the lower face of the base frame there may be mounted PLF material (e.g., a PLF screen). Laminar flow light fittings may be mounted to the lower face of the frame (e.g., the side members) if desired.

A profiled canopy may be secured to the upper face of the base frame. Preferably the profiled canopy is capable of providing a smooth and interrupted airflow from the modular structure into the PLF material. For example, the profiled canopy may have a substantially vertical open end (e.g., a substantially square open end) through which may be transmitted airflow from a modular structure. The vertical open end may be defined by two side walls joined in substantially parallel spaced apart relationship by an integral rear wall which curves inwardly away from the open end. The vertical open end may be fitted with a compression seal. For this purpose the ends of the two side walls and integral rear wall may be provided with a securing flange.

The powder handling booth may incorporate a clean room partition system adapted to meet the requirements of the pharmaceutical industry. The powder handling booth may comprise individual panels capable of being locked together thereby advantageously eliminating the need for fasteners. The powder handling booth may be adapted so that the number of panel joints are minimized (e.g., 5 or less) and are hygienically sealed by a thin bead of silicone.

The panels of the powder handling booth may be adapted to provide exceptional noise damping and vibration isolation. The panels may provide increased rigidity to support an upper mounted plenum arrangement. The rear wall of the powder handling booth may comprise a "service band" which may contain, inter alia, control buttons, the electrical and gauge piping, inverter and commissioning interface which permits entire commissioning from the interior of the booth. For example, the motor mounted inverter may be controlled via a link from the service band for ease of commissioning and set up. Preferably the service band has an aerofoil shaped exterior profile which improves dust capture in the processing zone by accelerating airflow over its surface.

Viewed from a further aspect the present invention provides a barrier means as hereinbefore defined.

The barrier means preferably permits the level of exposure to airborne dust of an operator in an operator breathing zone to be less than 10 $\mu g/m^3$.

BRIEF DESCRIPTION OF THE DRAWINGS

The present invention will now be described in a non-limitative sense with reference to the accompanying FIGS. in which:

FIG. 2b illustrates schematically a side view of the same embodiment illustrated in FIG. 2a;

DETAILED DESCRIPTION OF PREFERRED EMBODIMENTS AND METHODS

Figure 1A:
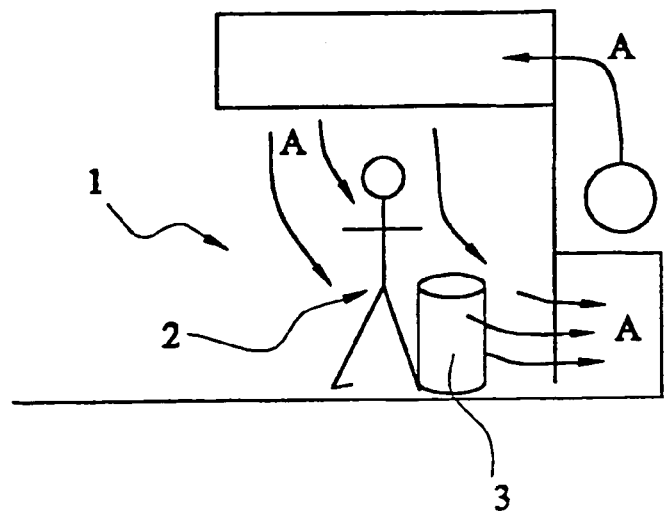
FIG. 1(a) illustrates a known down flow containment assembly.
Figure 1B:
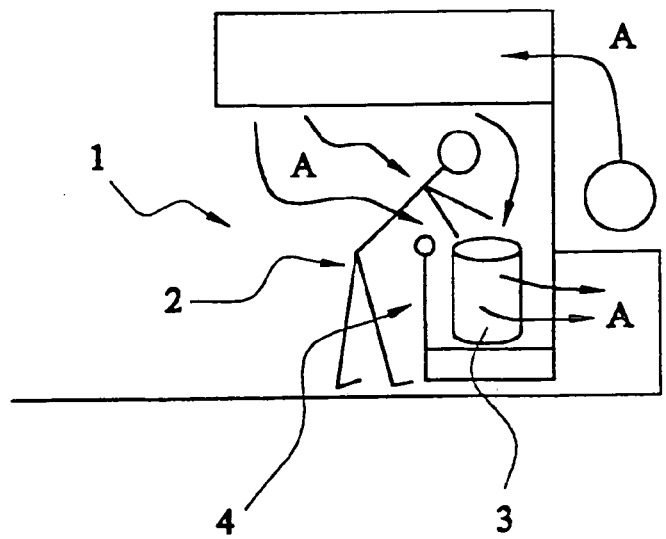
FIG. 1(b) illustrates the down flow containment assembly of FIG. 1(a) fitted with a work station.
Figure 1C:
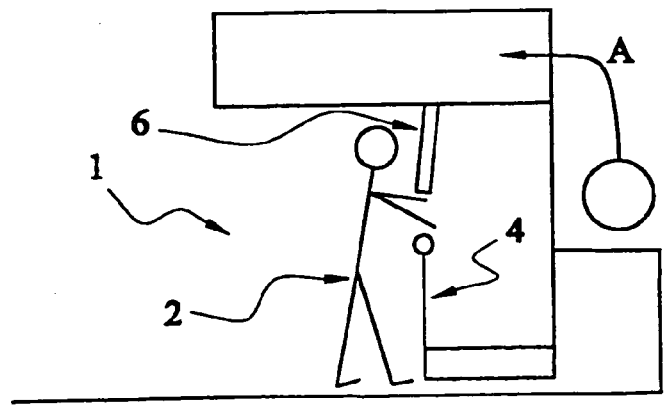
FIG. 1(c) illustrates a the down flow containment assembly of FIG. 2(a) with the addition of a transparent rigid screen.
Figure 2B:
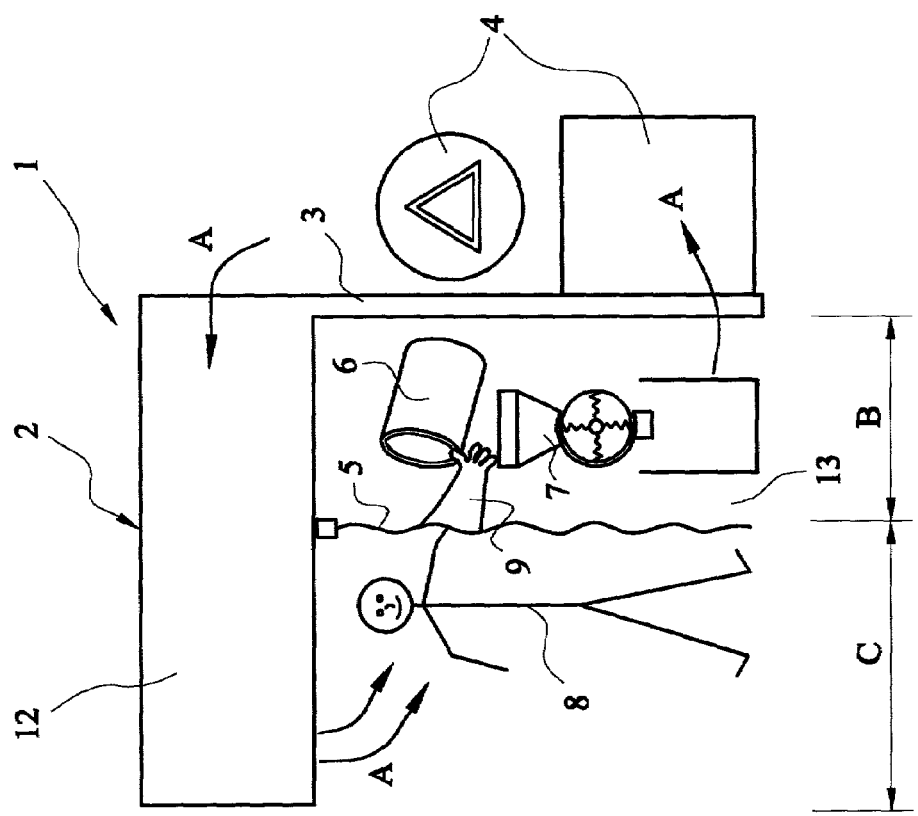
Figure 2A:
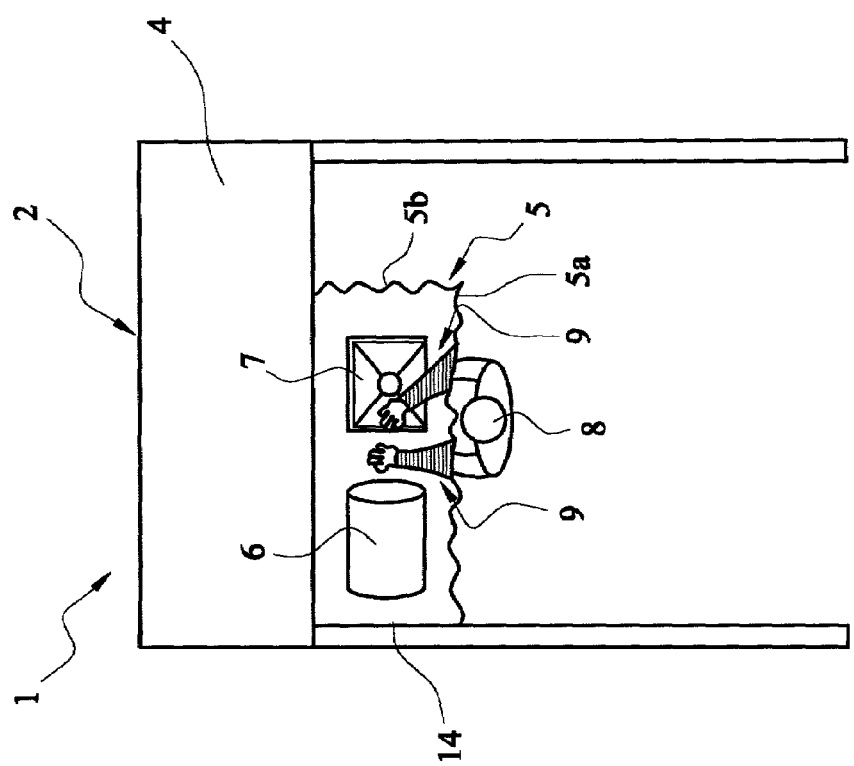
FIG. 2a illustrates schematically a plan view of an embodiment of the containment assembly of the invention.

With reference to FIGS. 2a and 2b, there is illustrated schematically an embodiment of the containment assembly according to the invention. The containment assembly designated generally by reference numeral 1 comprises a powder handling booth 2 of box-like configuration having a rear wall 3, a ceiling 12, a floor 13 and a side wall 14. In this embodiment, the powder handling booth 2 is a down flow containment booth in which the extraction fans and filters (and other necessary components) 4 are located to the rear of the rear wall 3. A down flow of air (A) in the containment zone is generated by the clockwise circulatory action of the fans and filters 4.

An enclosure barrier 5 has a front sheet 5a and a side sheet 5b extending substantially from ceiling 12 to floor 13 which (when placed against the rear wall 3 and side wall 14 of the powder handling booth 2) defines an enclosed processing zone B in which the desired operation is conducted (in this case transferring powder from a bin 6 to weighing means 7). The operator 8 is positioned outside the processing zone B and is able to operate within the processing zone B. The combined effect of the down flow air A and enclosure barrier 5 reduces exposure levels in the operator breathing zone (C) to those described in the Example which follows. The operator 8 is able to carry out the weighing operation by inserting right and left hands into the flexible gloved portions 9 in the front sheet 5a of the enclosure barrier 5.

Figure 3:
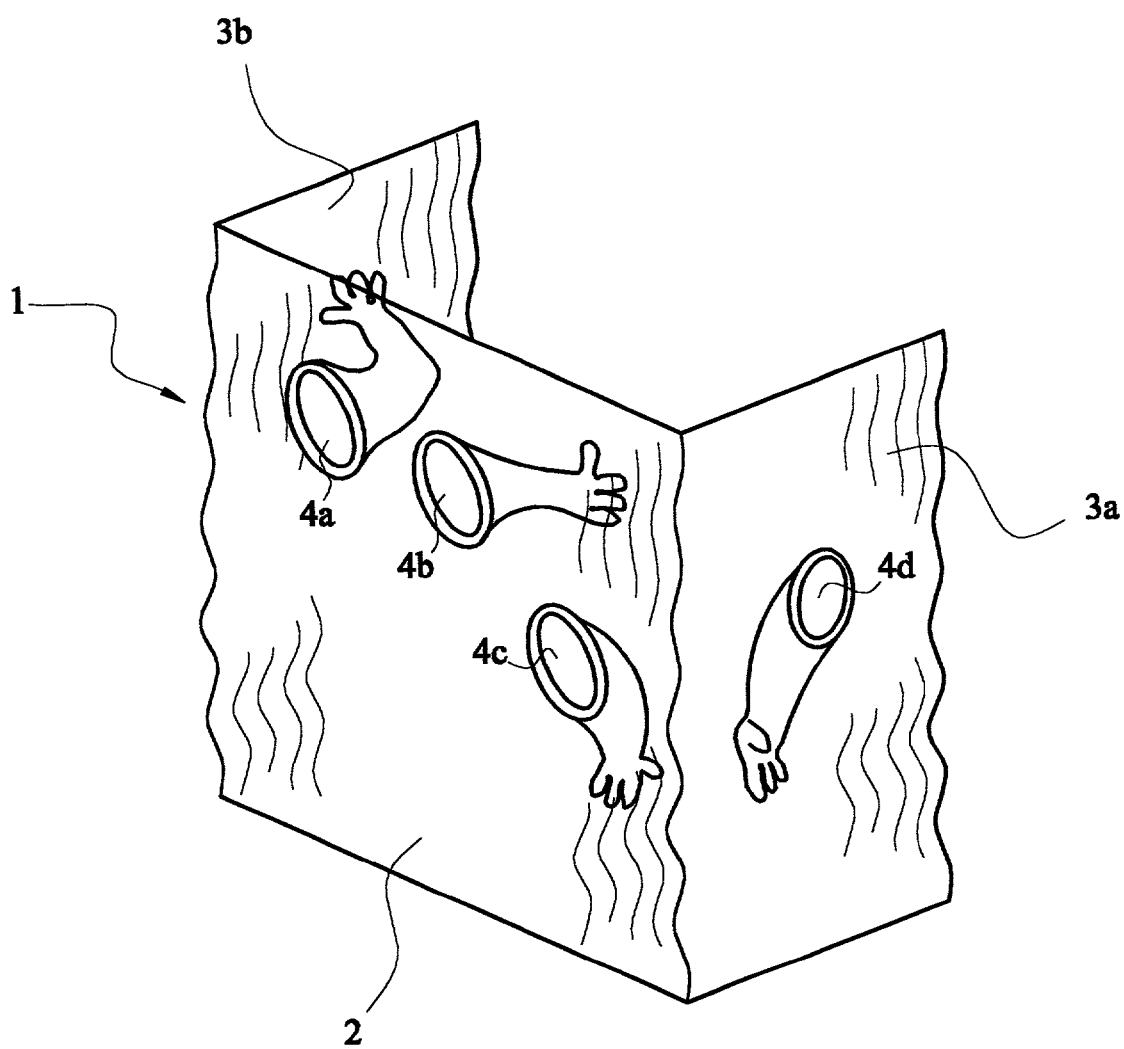
FIG. 3 illustrates an embodiment of the barrier means of the invention.

An embodiment of a self-contained enclosure barrier is illustrated in isolation in FIG. 3 and designated generally by reference numeral 1. The enclosure barrier 1 comprises a flexible front sheet 2 and two perpendicular flexible side sheets 3a and 3b mounted on a rigid framework (not shown), each composed almost entirely of flexible polyurethane which is fully transparent. When placed against the rear wall of a down flow containment booth, the enclosed region defines the processing zone. An operator positioned outside front sheet 2 (and therefore externally to the processing zone) is able to carry out an operation within the processing zone (for example powder weighing) by inserting each hand into a suitable one of the flexible sleeves terminating in gloved ends 4a, 4b, 4c and 4d. Each of the flexible sleeves terminating in gloved ends 4a, 4b and 4c are situated on the front sheet 2 and the fourth flexible sleeve terminating in a gloved end 4d is situated on the side sheet 3a. Each one of the flexible sleeves terminating in gloved ends 4a, 4b, 4c and 4d is sufficiently flexible to permit all round articulation.

Figure 4:
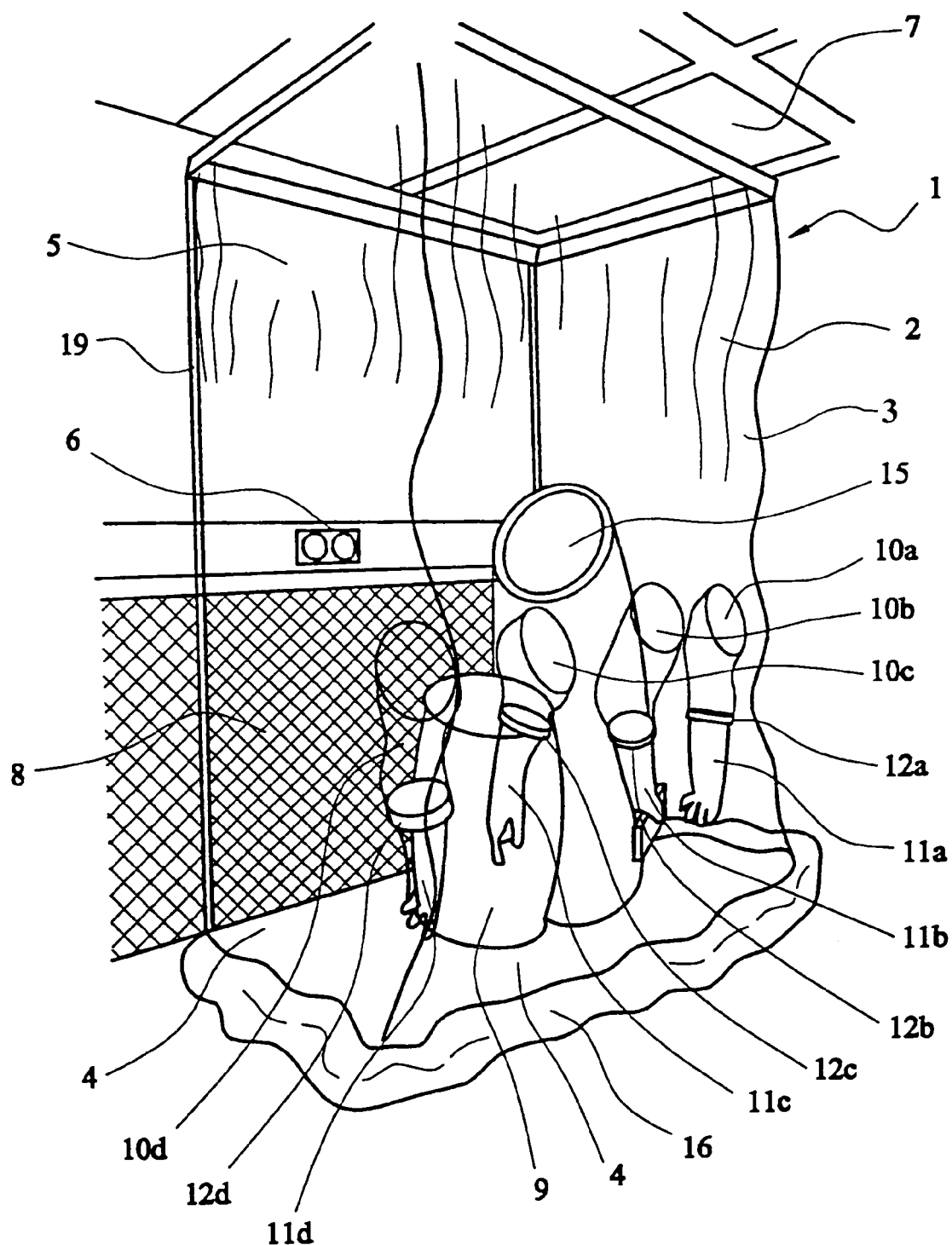
FIG. 4 illustrates a perspective view of an embodiment of the containment assembly of the invention.

An embodiment of the containment assembly in the form of an enclosure barrier 2 fitted in a down flow containment assembly is illustrated in FIG. 4 and designated generally by reference numeral 1. The enclosure barrier 2 comprises a front sheet 3 and a side sheet 4 each composed almost entirely of flexible polyurethane which is fully transparent. The down flow containment assembly comprises a rear wall 5 upon which is mounted a service band 6 and a framework ceiling 7 which transmits air flow downwardly into the containment zone during down flow of air into the powder handling booth. A grilled area 8 at the lower part of rear wall 5 transmits air flow out of the containment zone during down flow operation. The front sheet 3 is fitted to the ceiling 7 by hooks (not shown) and the side sheet 4 is fitted to the rear wall 5 by adhesive tape 19 to define an enclosed processing zone in which is located a powder drum 9 and a bulk powder drum 15 used as a reservoir to adjust the weight of powder.

The front sheet 3 is untethered at the floor and its lower edge 16 extends into an excess of material. The front sheet 3 comprises three flexible sleeves 10a, 10b and 10c, each of which terminates in a gloved end 11a, 11b and 11c respectively. The side sheet 4 comprises a single flexible sleeve 10d terminating in a gloved end 11d. Each gloved end is composed of thicker polyurethane than that of the flexible sleeve. The adjoining ends of each gloved end and flexible sleeve are secured to an internal strengthening ring 12a, 12b, 12c and 12d by an elastic band.

Figure 5:
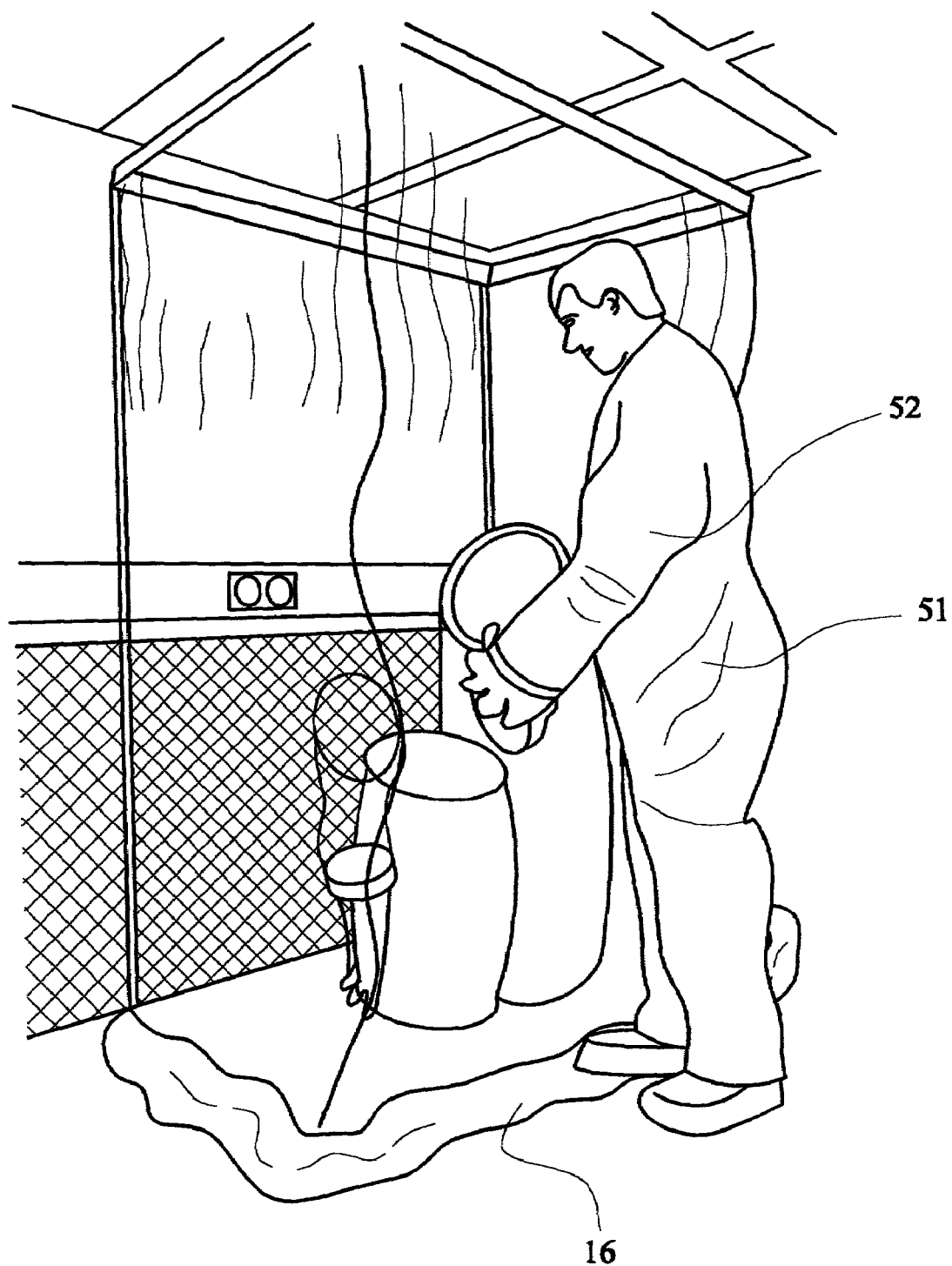
FIG. 5 illustrates the same perspective view of the embodiment of FIG. 4 with the operator outside the processing zone.

The use of the enclosure barrier 2 is shown in FIG. 5. An operator 51 is able to insert a left arm 52 and a right arm (hidden) into flexible sleeves 10c and 10b (respectively) which extend beyond the elbow until the fingers engage the gloved portions 11c and 11b respectively. The operator 51 is able to move freely in all directions and is assisted in vertical movement by the excess material at the untethered lower edge 15.

EXAMPLE

Factory Acceptance Testing of a Vacuum Transfer Down flow Booth

Two occupational hygiene (OH) air sampling surveys of the breathing zone and area air were conducted during factory acceptance testing (FAT) of a down flow booth (DFB) at Extract Technology Limited in Huddersfield, UK. The DFB is intended to be used for vacuum transfer of API from kegs. The primary objective of the surveys was to assess the effectiveness of the DFB compared with the design criteria of 10 µg/m³ as measured in the operator's breathing zone during routine operations.

Protocol

Samples were collected using 25 mm IOM sampling head and glass fiber filters and calibrated Gilian air sampling pumps. Lactose was used as the placebo for the survey. An American Industrial Hygiene Association (AIHA) accredited laboratory (National Loss Control Service Corporation (NATLSCO)) analyzed the samples using the lactose OH sampling and analytical method.

To prepare the area for air sampling, a plastic enclosure was installed to enclose the DFB and isolate the DFB from the rest of the manufacturing environment. The enclosure was designed to minimize the potential for cross contamination.

Prior to conducting the first survey, modifications to the DFB and equipment were made which included:
- Installation of a vacuum transfer system (compressor and lance)
- Changes to the height of the local exhaust ventilation and width of the slot
- Installation of a LEV blower with greater capacity
- Changes to the height of the drum (installation of false bottoms)

After the first survey, a further modification was made to incorporate a flexible polyurethane curtain having four glove ports within the powder handling booth surrounding the general processing zone. This formed the basis of the second survey.

Sample Collection—Breathing Zone

Air samples from the breathing zone were collected to assess the effectiveness of the DFB and vacuum transfer system in maintaining exposures below the target of 10 µg/m³. The initial samples were collected from the operator and assistant operator.

During the first survey, three transfer campaigns consisting of 450 kg of lactose were performed. For the first two batches, the sample filters were changed approximately half way through the transfer process. For the third batch, the same filter was used to assess the operator's exposure throughout the transfer. During the second batch, a salad bar screen was installed to evaluate the potential for improvement in exposure levels.

During the second survey, two transfer campaigns consisting of 210 kg of lactose were performed. For the first batch, the sample filters were changed approximately two thirds of the way through the transfer process. For the second batch, the same filter was used to assess the operator's exposure throughout the transfer.

Although the incorporation of the flexible polyurethane barrier within the booth required some changes in the operating procedures, wherever possible similar procedures were adopted.

Sample Collection—Area Air

In both surveys, the area air samples were collected in two different locations. One sample was collected inside the DFB enclosure in the back corner outside the containment zone. The second sample was collected outside the DFB enclosure. The sample collected outside the DFB provides an indication of background lactose levels and potential for false positives.

Operator Breathing Zone Results

Survey 1 (Table 1-1)

All 10 operator breathing zone air samples exceeded the target of 10 µg/m³. The sampling results ranged from 12 µg/m³ to 2400 µg/m³ with a mean of 415 µg/m³. There was very little difference between the samples collected with and without the salad bar screen.

Survey 2 (Table 1-2)

2 out of the 6 air samples from the operating breathing zone exceeded the target of 10 µg/m³. The sampling results ranged from 2.1 µg/m³ to 12 µg/m³ with a mean of 6.8 µg/m³.

Area Air Results

Survey 1 (Table 2-1)

The five area air sampling results ranged from 0.59 µg/m³ to 11 µg/m³.

Survey 2 (Table 2-2)

The four area air sampling results ranged from <0.14 µg/m³ to 110 µg/m³

Conclusions

Survey 1

All the operator breathing zone results exceeded the target concentration of 10 µg/m³ for both the operator and assistant operator.

If background levels of lactose presented a positive interference the impact was marginal because the area air results were significantly lower then the operator breathing zone results.

Survey 2

The addition of the flexible polyurethane curtain within the booth surrounding the general processing area and the associated work practices significantly reduced the operator exposure levels.

The background levels of lactose were much higher and this was most probably a consequence of poor containment within the lactose receiving area. The results suggest that the flexible curtain affords a higher degree of protection. Given the high background levels, the different amount of lactose transferred, the different times of transfer and the different operators, it is difficult to quantify the improvement with confidence.

TABLE 1-1

| Sample # | Activity | Duration | Concentration $\mu g/m^3$ |
|---|---|---|---|
| 20036906 | Assistant Operator/DFB Vacuum Transfer - 225 kg lactose | 28 | 76 |
| 20036911 | Assistant Operator/DFB Vacuum Transfer - 225 kg lactose | 25 | 250 |
| 20036914 | Operator/DFB Vacuum Transfer 225 kg lactose | 25 | 140 |
| 20036919 | Operator/DFB Vacuum Transfer 225 kg lactose | 27 | 110 |
| 20036910 | Operator/DFB Vacuum Transfer 225 kg lactose - salad bar | 16 | 92 |
| 20036925 | Operator/DFB Vacuum Transfer 225 kg lactose - salad bar | 22 | 2400 |
| 20036926 | Assistant Operator/DFB Vacuum Transfer - 225 kg lactose - salad bar | 16 | 200 |
| 20036922 | Assistant Operator/DFB Vacuum Transfer - 225 kg lactose - salad bar | 21 | 400 |
| 20036909 | Operator/DFB Vacuum Transfer 450 kg lactose | 29 | 470 |
| 20036915 | Assistant Operator/DFB Vacuum Transfer - 450 kg lactose | 27 | 12 |

Lactose limit of detection = 0.02 µg (20 ng)

TABLE 1-2

| Sample # | Activity | Duration | Concentration $\mu g/m^3$ |
|---|---|---|---|
| 20057128 | Operator/DFB Vacuum Transfer 70 kg lactose | 24 | 4.4 |
| 20057129 | Operator/DFB Vacuum Transfer 210 kg lactose | 51 | 9.3 |
| 20057130 | Assistant Operator/DFB Vacuum Transfer - 140 kg lactose | 42 | 2.1 |
| 20057132 | Assistant Operator/DFB Vacuum Transfer - 210 kg lactose | 51 | 11 |
| 20057134 | Assistant Operator/DFB Vacuum Transfer - 70 kg lactose | 23 | 12 |
| 20057135 | Operator/DFB Vacuum Transfer 140 kg lactose | 41 | 2.2 |

Lactose limit of detection = 0.02 µg (20 ng)

TABLE 2-1

| Sample # | Type | Location/Activity | Duration (min) | Concentration $\mu g/m^3$ |
|---|---|---|---|---|
| 20036907 | Area | Outside DFB enclosure in front of door/lactose vacuum transfer inside DFB | 54 | 0.59 |
| 20036920 | Area | Inside DFB enclosure on post in front of DFB next to TSI/lactose vacuum transfer inside DFB | 55 | 3.1 |
| 20036927 | Area | Outside DFB enclosure in front of door/lactose vacuum transfer inside DFB | 41 | 11 |
| 20036905 | Area | Inside DFB enclosure on post in front of DFB next to TSI/lactose vacuum transfer inside DFB | 40 | 3.9 |
| 20036928 | Area | Inside DFB enclosure on post in front of DFB next to TSI/lactose vacuum transfer inside DFB | 28 | 7.6 |

Lactose limit of detection = 0.02 µg (20 ng)

TABLE 2-2

| Sample # | Type | Location/Activity | Duration (min) | Concentration $\mu g/m^3$ |
|---|---|---|---|---|
| 20057131 | Area | Inside DFB enclosure on post in front of DFB next to TSI/lactose vacuum transfer inside DFB | 72 | <0.14 |
| 20057136 | Area | Inside DFB enclosure on post in front of DFB next to TSI/lactose vacuum transfer inside DFB | 45 | <0.22 |
| 20057137 | Area | Outside DFB enclosure in front of door/lactose vacuum transfer inside DFB | 78 | 37 |
| 99045687 | Area | Outside DFB enclosure in front of door/lactose vacuum transfer inside DFB | 50 | 110 |

Lactose limit of detection = 0.02 µg (20 ng)

SUMMARY

The results from the first survey indicated that the exposure level in the operator breathing zone exceeded the target level of 10 µg/m³. Modifications were made by incorporating a polyurethane curtain fitted with gloves into the down flow booth and this led to a surprising reduction in the level of exposure in the operator breathing zone.

What is claimed is:

1. A down flow containment assembly comprising:
   a powder handling booth of sufficient size to admit an operator, said powder handling booth having a rear wall, a floor for permitting the operator to stand thereon, and an upper surface;
   a barrier means positioned in the powder handling booth and spaced apart from the rear wall to define a processing zone between the barrier means and the rear wall, wherein the barrier means extends from the upper surface at least to the floor of the powder handling booth, the barrier means comprising a front sheet and at least one side sheet, and at least a first part adapted or adaptable to permit the operator in the powder handling booth outside the processing zone to operate inside the processing zone, the first part comprising a flexible material extending at least to the floor and an excess of the flexible material resting directly on the floor, the flexible material comprising an untethered lower edge and a flexible portion in the shape of a glove or capable of being deformed into the shape of a glove; and means for inducing air flow downwardly in the powder handling booth, wherein the rear wall has a lower end and an upper end and is adapted at or near the lower end to transmit externally an air flow and adapted at or near to the upper end to transmit internally the air flow.

2. A containment assembly as claimed in claim 1, wherein more than the first part of the barrier means comprises a flexible material.

3. A containment assembly as claimed in claim 1, wherein substantially the whole of the barrier means is composed of flexible material.

4. A containment assembly as claimed in claim 1, wherein the barrier means comprises a screen barrier.

5. A containment assembly as claimed in claim 1, wherein the barrier means comprises an enclosure barrier.

6. A containment assembly as claimed in claim 5, wherein the at least one side sheet comprises, a first side sheet and a second side sheet, and wherein the enclosure barrier encloses the processing zone when the enclosure barrier is positioned in the powder handling booth spaced apart from the rear wall.

7. A containment assembly as claimed in claim 6, wherein substantially the whole of the front sheet is composed of the flexible material.

8. A containment assembly as claimed in claim 6, wherein substantially the whole of the first side sheet is composed of the flexible material.

9. A containment assembly as claimed in claim 6, wherein at least the front sheet is adapted or adaptable to permit the operator in the powder handling booth outside the processing zone to operate inside the processing zone.

10. A containment assembly as claimed in claim 1, wherein the barrier means is bound within a rigid framework to define a self-contained unit.

11. A containment assembly as claimed in claim 1, wherein the at least one flexible portion in the shape of a glove or capable of being deformed into the shape of a glove comprises a flexible sleeve terminating in a gloved end.

12. A containment assembly as claimed in claim 1, wherein the barrier means is at least partially transparent.

13. A containment assembly as claimed in claim 12, wherein the at least partially transparent flexible barrier means comprises a transparent window at or near to a typical operator's eye height.

14. A containment assembly as claimed in claim 1, wherein the flexible material resting directly on the floor on which the operator is permitted to stand is situated outside of the processing zone.

15. A down flow containment assembly comprising:

a powder handling booth of sufficient size to admit an operator, said powder handling booth having a rear wall, a floor for permitting the operator to stand thereon, and an upper surface;

a barrier means comprising a curtain-type screen barrier, positioned in the powder handling booth and spaced apart from the rear wall to define a processing zone between the barrier means and the rear wall, wherein the barrier means extends from the upper surface at least to the floor of the powder handling booth, the barrier means comprising a front sheet, and at least one side sheet, and at least a first part adapted or adaptable to permit the operator in the powder handling booth outside the processing zone to operate inside the processing zone, the first part comprising a flexible material extending at least to the floor and an excess of the flexible material resting directly on the floor, the flexible material comprising an untethered lower edge and a flexible portion in the shape of a glove or capable of being deformed into the shape of a glove; and means for inducing air flow downwardly in the powder handling booth, wherein the rear wall has a lower end and an upper end and is adapted at or near the lower end to transmit externally an air flow and adapted at or near to the upper end to transmit internally the air flow.

16. A containment assembly as claimed in claim 15, wherein the flexible material resting directly on the floor on which the operator is permitted to stand is situated outside of the processing zone.

* * * * *